United States Patent [19]

Wu

[11] Patent Number: 6,025,981
[45] Date of Patent: Feb. 15, 2000

[54] FLEXIBLE VOLTAGE TRANSIENT DETECTOR CIRCUIT

[75] Inventor: James Wu, Taipei, Taiwan

[73] Assignee: Mosel Vitelic Inc., Hsinchu, Taiwan

[21] Appl. No.: 09/185,522

[22] Filed: Nov. 4, 1998

[51] Int. Cl.[7] ................................................ H02H 3/20
[52] U.S. Cl. ............................ 361/91.1; 361/86; 361/111
[58] Field of Search ............................. 361/91.1, 86, 111

[56] References Cited

U.S. PATENT DOCUMENTS 5,822,166   10/1998   Massie ..................................... 361/111

Primary Examiner—Michael J. Sherry
Attorney, Agent, or Firm—Bacon & Thomas

[57] ABSTRACT

A flexible voltage transient detector circuit is disclosed. The detector circuit includes an initialization unit, a first comparator, and a second comparator. The output of the initialization unit decides the operational modes of an integrated circuit. When the power voltage suddenly falls below the lower reference voltage, the first comparator will give an output to reset the initialization unit and force the integrated circuit into the initialized mode. Once the power voltage rises back above the higher reference voltage, the second comparator will order the counting of the initialization unit to start. The integrated circuit remains in the initialized mode until the counting stops after a period of delay time which can be flexibly set as needed and then returns the normal situation. This circuit design prevents the unpredictable operation of the integrated circuit.

12 Claims, 5 Drawing Sheets

FLEXIBLE VOLTAGE TRANSIENT DETECTOR CIRCUIT

BACKGROUND OF THE INVENTION (1) Field of the Invention

This invention relates generally to a flexible voltage transient detector circuit with two different critical points, and more particularly to a voltage transient detector circuit with a simple pattern and a delay time which can be set flexibly as needed.

(2) Description of the Prior Art

Because of the continuous shirkage in today's device manufacture technology, a lot of electronic circuits can be put together in an tiny integrated circuit (IC) chip. A sudden change in the environment of the system such as voltage transients in the primary supply voltage, may result in an abnormal operation of the integrated circuit, and thus affect the reliability of the products.

Accordingly, a voltage transient detector circuit can be provided for solving the above mentioned problem. When the system itself is disturbed by the aforementioned undesired voltage transients, the detector circuit can immediately detect the change and further prevent the error operation of the integrated circuit. Once the supply voltage returns its regular condition, the integrated circuit can be continuously manipulated in the normal mode.

One of the traditional types of the voltage transient detector circuit is shown in FIG. 1A. The detector circuit comprises an initialization unit 11, producing an output INIT for deciding the integrated circuit 10 to operate in the normal mode or the initialized mode; and a comparator 13, connected to the input of the above initialization unit 11 for resetting the initialization unit 11 and thus making the integrated circuit 10 to return the initialized mode. The comparator 13 with a noninverting input connected to a reference voltage $V_{ref}$, and an inverting input connected to a power supply 17 can compare the power voltage $V_{DD}$ with the reference voltage $V_{ref}$.

A level shifter 15 can be optionally added in between the power supply 17 and the comparator 13 for lowering the power voltage $V_{DD}$ to a constant voltage $V_{DD}$-L.S (L.S is referred as the voltage across said level shifter). The lowered voltage is then convenient for comparing with the reference voltage $V_{ref}$. When the output of the initialization unit 11 is non-active, the INIT value is 0, and the integrated circuit 10 stays in the normal mode. On the other hand, when the output of the initialization unit 11 is active, the INIT value is 1, and the integrated circuit 10 goes back to the initialized mode.

Referring to FIG. 1B, there is shown a timing chart corresponding to the circuit of FIG. 1A. In the beginning when the power supply 17 is steady and the power voltage $V_{DD}$ stays at a normal value (denoted as A1 in FIG. 1B), the output of the initialization unit 11 is non-active, INIT=0, and the integrated circuit 10 is in the normal condition. Once the power voltage $V_{DD}$ suddenly drops below its critical point (it means $V_{DD}$-L.S±$V_{ref}$) which is denoted as B1 in FIG. 1B, the comparator 13 will produce an output signal to reset the initialization unit 11 and make it to produce an active output wherein INIT=1. At the same time the integrated circuit 10 is in the initialized mode that means the device returning to the initial state and to wait for further orders. When the power voltage $V_{DD}$ rises above the critical point which is denoted as C1 in FIG. 1B, the comparator 13 will also generate an output signal to the initialization unit 11 and make it into the non-active state wherein INIT=0, and the integrated circuit 10 will go back to the regular condition.

However, if the power voltage $V_{DD}$ becomes unsteady and constantly goes up and down near the critical point (denoted as the vibrating curve between points C1 and D1 in FIG. 1B), the states of the integrated circuit 10 would be changed between the initialized mode and the normal mode all the time that result in the unpredictable status of the integrated circuit 10. Also, when the power voltage rises from the voltage below the critical point (B1) to that above the critical point (C1), the integrated circuit 10 will immediately back from the initialized mode to the normal mode. This will further cause the melt functions of the integrated circuit 10 due to inadequate time to return the normal condition.

SUMMARY OF THE INVENTION

Accordingly, it is a primary object of the present invention to provide a flexible voltage transient detector circuit with two different critical points. The circuit can prevent the anomaly of the integrated circuit as it transfers between the initialized mode and the normal mode because of the continuously unsteadiness of the power supply voltage.

It is another object of the present invention to provide a flexible voltage transient detector circuit with two different critical points. The circuit possesses a period of delay time for the integrated circuit to return the normal mode when the power voltage rises back and above the upper critical point. Also the length of the delay time can be designed as it is needed.

In order to accomplish the objects of the present invention, the present invention provides an improving detector circuit including an initialization unit, a first comparator, and a second comparator. The output of the initialization unit decides the operational mode of the integrated circuit and it comprises a counter for counting the delay time. The output of the first comparator is given to reset said initialization unit and it possesses a lower reference voltage for comparing with the power voltage. The output of the second comparator is used to start the counting of the initialization unit and it possesses a higher reference voltage for comparing with the power voltage. When the power voltage suddenly falls below the lower reference voltage, the first comparator will produce an output signal to reset the initialization unit and thus make the integrated circuit into the initialized mode.

Once the aforementioned power voltage rises back and above the higher reference voltage, the second comparator will give an order to start the counting of the initialization unit. The integrated circuit will remain in the initialized mode until the counting stops after a period of delay time and then returns the normal situation. Therefore, even the power voltage goes back and forth near the lower reference voltage, the integrated circuit will remain in the initialized mode which can prevent the unpredictable operation in it. In addition the length of said delay time can be designed flexibly in the above counting as necessary. The present invention with the above advantages along with its simple pattern can be applied to various kinds of integrated circuits.

BRIEF DESCRIPTION OF THE DRAWINGS

The accompanying drawings form a material part of this description, in which.

DETAILED DESCRIPTION OF THE PREFERRED EMBODIMENT

The invention disclosed herein is directed to a flexible voltage transient detector circuit. In the following description, numerous details are set forth in order to provide a thorough understanding of the present invention. It will be appreciated by one skilled in the art that variations of these specific details are possible while still achieving the results of the present invention. In other instance, well-known aspects are not described in detail in order not to unnecessarily obscure the present invention.

Figure 1A:
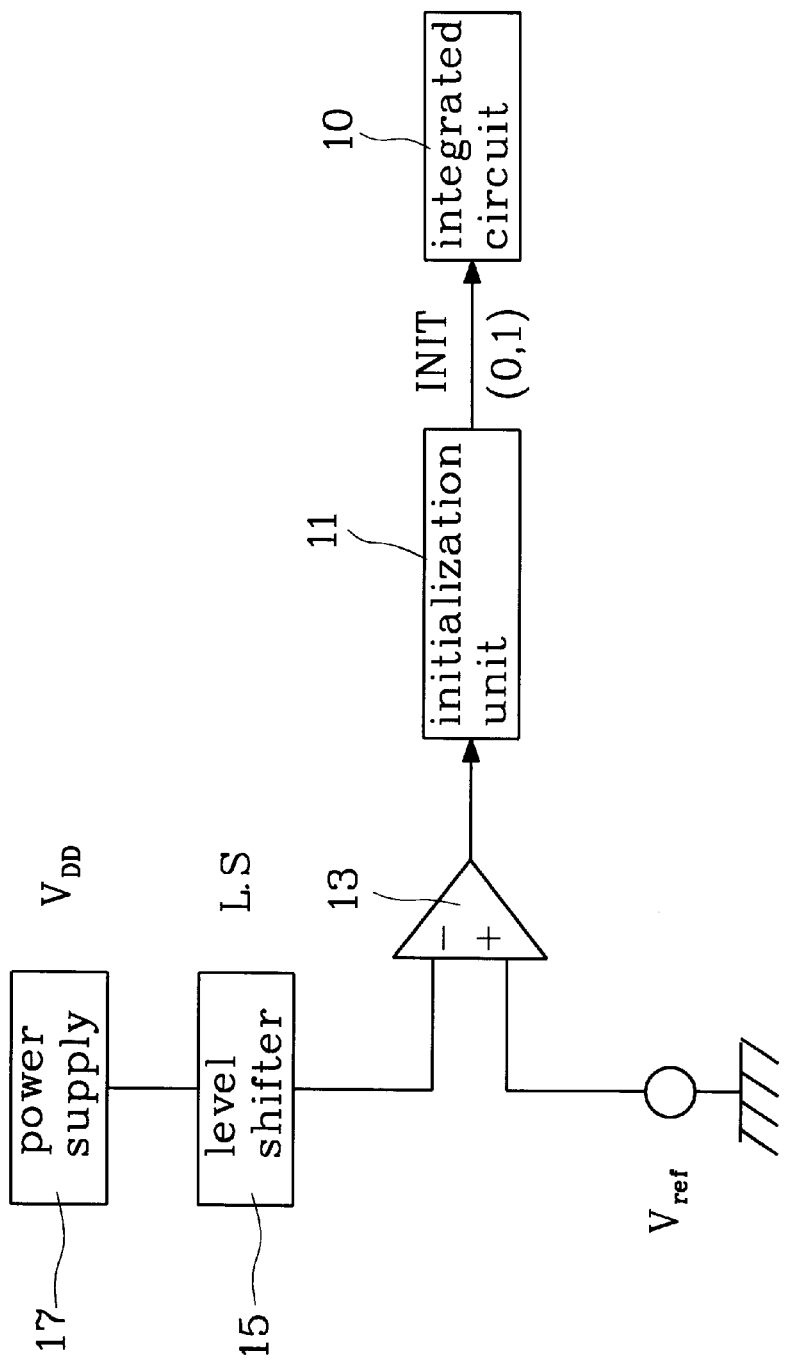
FIG. 1A is a block diagram of the conventional voltage transient detector circuit.
Figure 1:
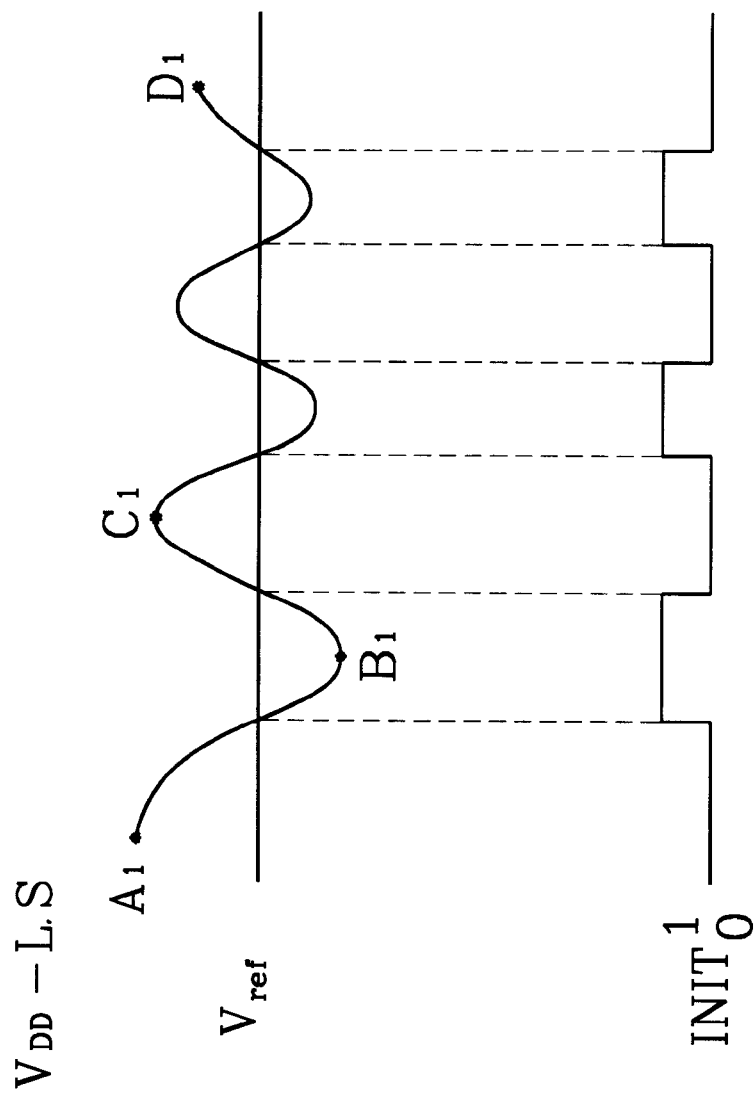
FIG. 1B is a schematic diagram of the output (INIT) of conventional voltage transient detector relative to the change of the power voltage.
Figure 2:
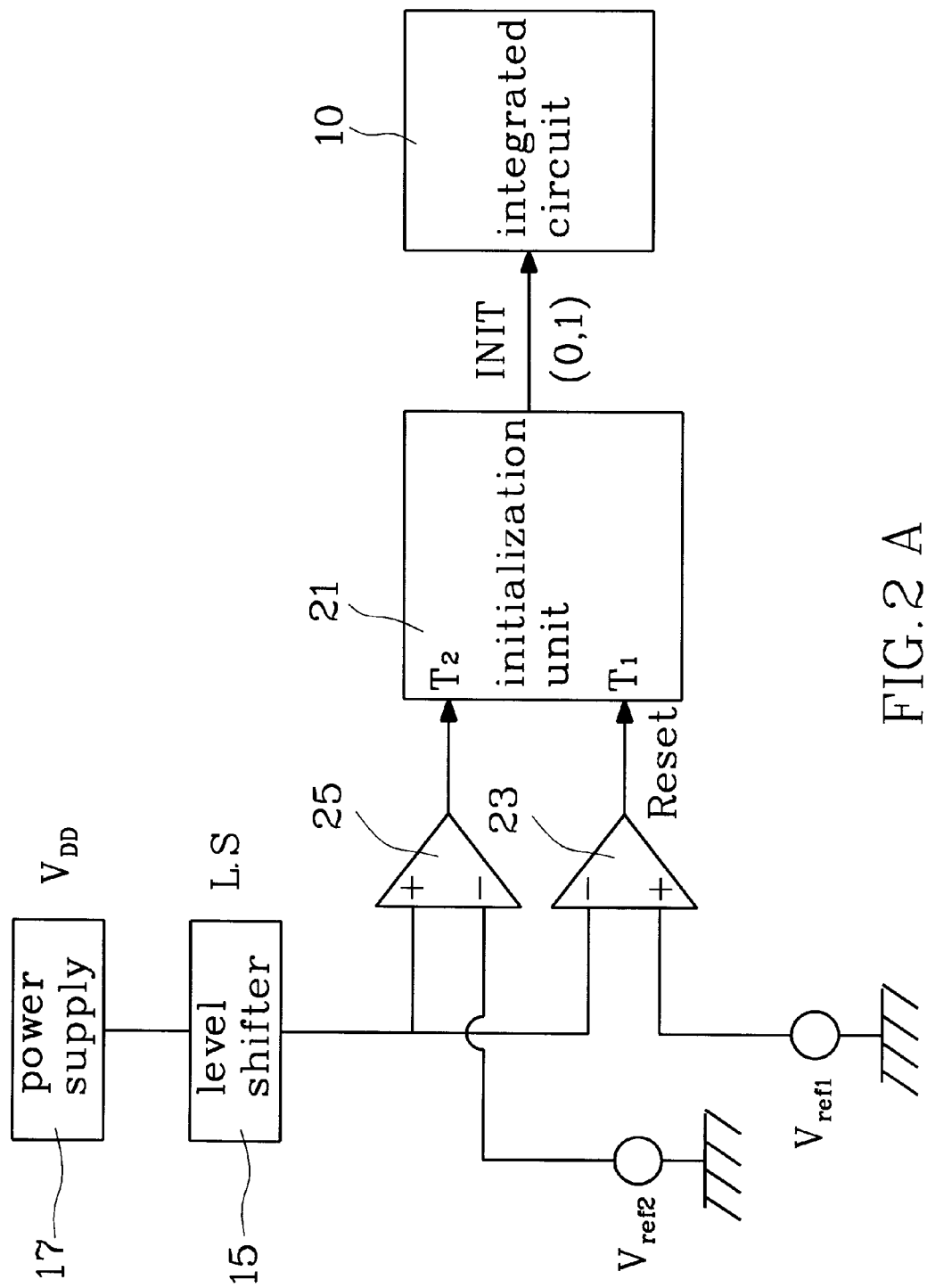
FIG. 2A is a block diagram of a voltage transient detector circuit according to the present invention.
FIG. 2B is a block diagram of the initialization unit according to the present invention.
FIG. 2C is a schematic diagram of the output of the first comparator and the output of the initialization unit relative to the change of the power voltage according to the present invention.
Figure 2:
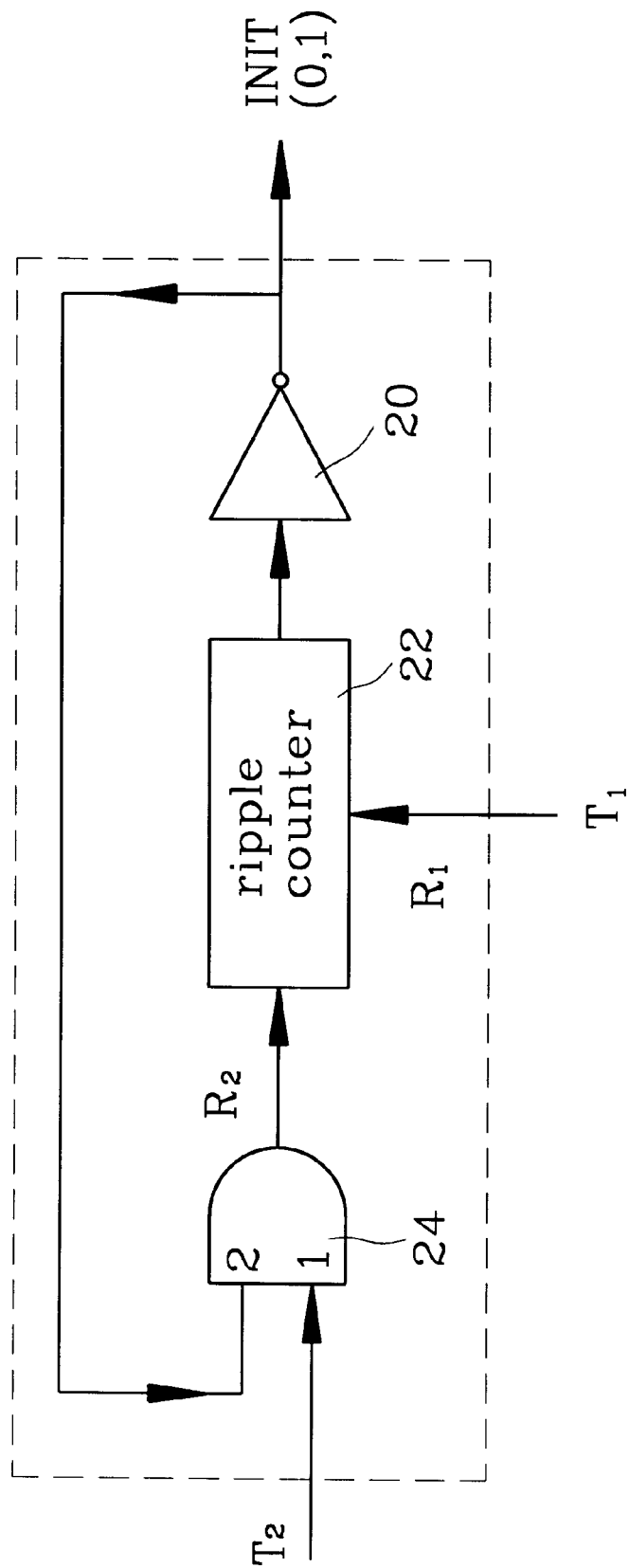

Referring now to FIG. 2A, it is a block diagram of a voltage transient detector circuit according to the present invention. The circuit includes an initialization unit 21, a first comparator 23, and a second comparator 25. The output of the initialization unit 21 decides the operational mode of the integrated circuit 10 and is represented by INIT. The first comparator 23 includes an output terminal, a noninverting input terminal, and an inverting input terminal. The output terminal of the first comparator 23 is connected to first input terminal T1 of the initialization unit 21, so that the output signal produced by the first comparator 23 which is denoted as Reset can reset the initialization unit 21. The noninverting input terminal is connected to a first reference voltage $V_{ref1}$, and the inverting input terminal is connected to the power supply 17. These two terminals can be used for comparing the power voltage $V_{DD}$ with the first reference voltage $V_{ref1}$.

The second comparator 25 also includes an output terminal, an inverting input terminal, and a noninverting input terminal. The output terminal of the second comparator 25 is connected to second input terminal T2 of the initialization unit 21, so that the output signal produced by the second comparator 25 can start the counting of the initialization unit 21. The inverting input terminal is connected to a second reference voltage $V_{ref2}$, and the noninverting input terminal is connected to a power supply 17. These two terminals can be used for comparing the power voltage $V_{DD}$ with the second reference voltage $V_{ref2}$.

The first and second reference voltages $V_{ref1}$, $V_{ref2}$ are relative to the GND voltage, and their relationship is $V_{ref2} > V_{ref1}$. The second reference voltage $V_{ref2}$ is lower than the normal power voltage (the output of the power supply 17 when it's not disturbed). A level shifter 15 can be optionally added in between the noninverting input terminal of the second comparator 25 and power supply 17. It is for lowering the power voltage $V_{DD}$ to a constant voltage $V_{DD}$-L.S. (L.S. is denoted as the voltage across said level shifter 15), and for comparing these two reference voltages $V_{ref1}$ and $V_{ref2}$. Additionally, there are two kinds of output signals of the initialization unit 21: INIT=0 is non-active, and the integrated circuit 10 is in the normal mode; INIT=1 is active, and the integrated circuit 10 is reset to its initialized mode.

Referring now to FIG. 2B, it is a block diagram of the initialization unit according to the present invention. The initialization unit 21 includes a NOT gate 20, a ripple counter 22, and an AND gate 24. The output of the NOT gate 20 is the INIT values 0 or 1 for deciding the operational mode of the integrated circuit 10. The ripple counter 22 comprises an output terminal connected to the input of the NOT gate 20 for deciding the output of the NOT-gate 20. The ripple counter 22 further comprises an input terminal R1 which is the input terminal T1 of the initialization unit and used for accepting the output "Reset" of the first comparator 23.

The AND gate 24 comprises an output terminal, a first input terminal, and a second input terminal. The output terminal is connected to another input terminal R2 of the ripple counter 22 for starting the counting of the ripple counter 22. The first input terminal is just the input terminal T2 of the initialization unit 21 and used for accepting the output of the second comparator 25. The second input terminal is connected to the output terminal of the NOT-gate 20 to form a feedback loop. The above-mentioned ripple counter 22 can be replaced by other types of counter such as an up/down counter, which does not depart from the spirit and scope of the present invention.

Figure 2C:
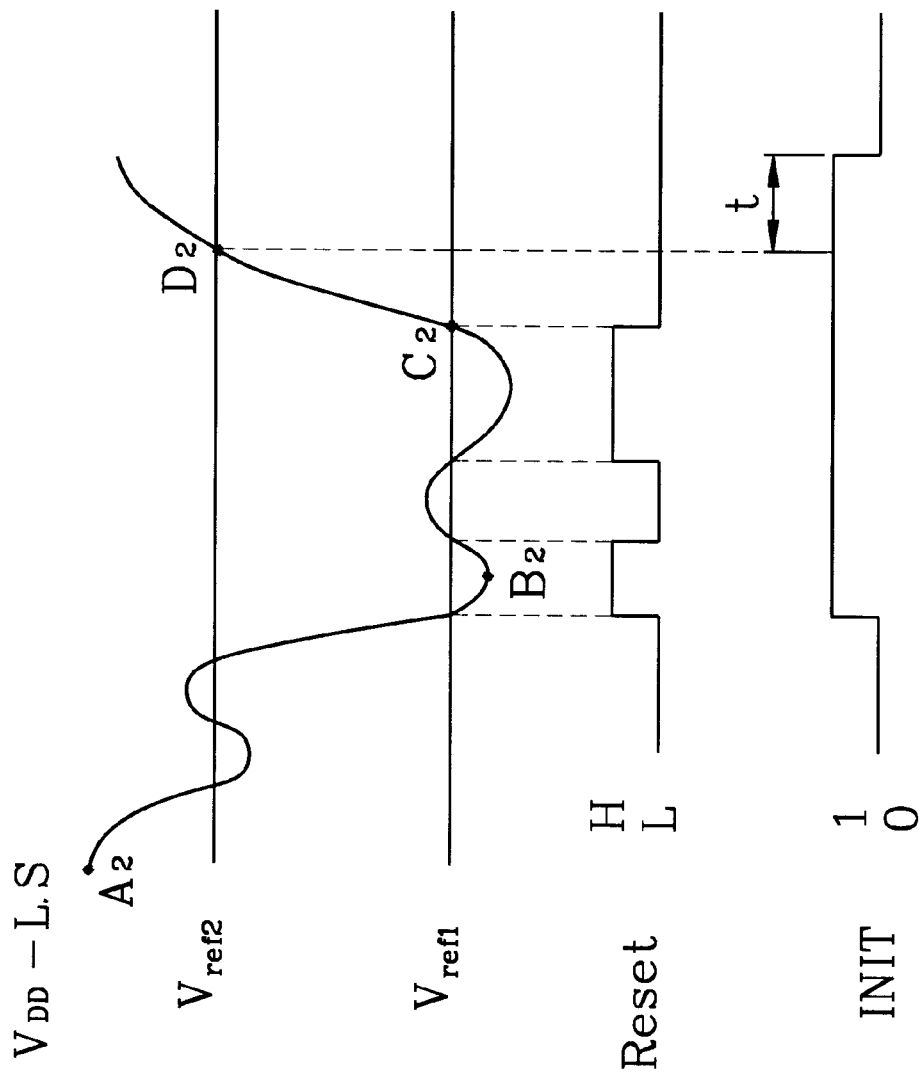

Referring now to FIG. 2C, it is a timing diagram of the output (Reset) of the first comparator and the output (INIT) of the initialization unit corresponding to the changes of the power voltage according to the present invention. In the beginning the system is steady and the power voltage $V_{DD}$ maintains at a normal value (denoted as A2 in FIG. 2C), the output of the initialization unit 11 is non-active, INIT=0, therefore, the integrated circuit 10 is in its normal condition. Once the power voltage $V_{DD}$ suddenly drops below the first critical voltage (it means $V_{DD}$-L.S±$V_{ref1}$) which is denoted as B2 in FIG. 2C, the first comparator 23 will produce an "Reset" signal to reset the ripple counter 22 in the initialization unit 21 to protect the integrated circuit. The ripple counter 22 will further give an output to the NOT-gate 20 thereto produce an active output signal, that is, INIT=1. At the same time the integrated circuit 10 stays in the initialized mode which means it doesn't function temporarily and waits for further instructions.

Following description is the key point of the present invention. While the power voltage $V_{DD}$ becomes unstable and constantly fluctuates near the first critical point (denoted as the vibrating curve between points B2 and C2 in FIG. 2C), the "Reset" output of the first comparator 23 will steadily change between the high value (H) and the low value (L). However the INIT output of the initialization unit 21 controlled by the second comparator 25 will maintain active before the power voltage $V_{DD}$ reaches the second critical point ($V_{DD}$-L.S=$V_{ref1}$, as denoted by the point D2 in FIG. 2C). Therefore the small fluctuation near the first critical point won't result in the unpredictable operations of the integrated circuit 10 as the prior art mentioned above. When the power voltage $V_{DD}$ rises above the second critical point which is denoted as D2 in FIG. 2C, the second comparator 25 will give an order to start the counting of the ripple counter 22 in the initialization unit 21. At that time INIT=1 and the integrated circuit 10 stays in the initialized mode for a few more seconds to ensure there is no voltage fluctuation in the system.

As the ripple counter 22 counts up to a constant value t, it will stop counting and then make the NOT-gate 20 to produce an output INIT=0. This means the output of the initialization unit 21 is now non-active and the integrated circuit 10 comes back to its normal mode. The above constant value t is called the delay time. Its purpose is to give the system enough time in order that the integrated circuit 10 will return the normal mode only when the power supply 17 has been stabilized to prevent the abnormal operations. Also, the length of the delay time (t) can be designed flexibly in the counting of said ripple counter 22 as necessary for different integrated circuits 10.

The present invention provides a flexible voltage transient detector circuit with two different critical voltages $V_{ref1}$ and $V_{ref1}$. It can prevent the anomaly of the integrated circuit 10 as it fluctuates between the initialized mode and the normal mode because of the continuously unsteadiness of the power voltage $V_{DD}$. In addition, the circuit possesses a period of delay time (t) for the integrated circuit 10 to return its normal mode when the power voltage $V_{DD}$ rises back and above the upper critical voltage $V_{ref2}$. The length of the delay time can be designed as it is needed. Also its simple pattern and pure connection between block circuits make it more applicable to every kind of the integrated circuit 10.

While the invention has been particularly shown and described with reference to a preferred embodiment, it will be understood by those skilled in the art that various changes in form and detail may be made therein without departing from the spirit and scope of the present invention.

What is claimed is:

1. A flexible voltage transient detector circuit, comprising
   an initialization unit, wherein the output (INIT) of said initialization unit decides the operational modes of an integrated circuit;
   a first comparator, comprising an output terminal connected to an input terminal of the initialization unit so that the output of said first comparator can reset said initialization unit, a noninverting input terminal connected to a first reference voltage, and an inverting input terminal connected to a power supply for comparing the power voltage with the first reference voltage; and
   a second comparator, comprising an output terminal connected to second input terminal of the initialization unit so that the output of said comparator can start the counting of said initialization unit, an inverting input terminal connected to a second reference voltage, and a noninverting input terminal connected to said power supply for comparing the power voltage with the second reference voltage.

2. The circuit according to claim 1, wherein said initialization unit comprises a counter for producing a delay time.

3. The circuit according to claim 2, wherein said counter is a ripple counter.

4. The circuit according to claim 1, further comprising a level shifter between the noninverting input terminal of said second comparator and said power supply for lowering the power voltage to a constant voltage.

5. The circuit according to claim 1, wherein said initialization unit is non-active when the output (INIT) is low, and said integrated circuit is in normal mode.

6. The circuit according to claim 1, wherein said initialization unit is active when the output (INIT) is high, and the integrated circuit is in initialized mode.

7. The circuit according to claim 1, wherein said second reference voltage is higher than said first reference voltage.

8. The circuit according to claim 1, wherein the output of said initialization unit is non-active and said integrated circuit is in the normal mode when said power supply is steady at a normal value.

9. The circuit according to claim 1, wherein said first comparator produces an output to said initialization unit and thus resets said integrated circuit to initialized mode when said power voltage drops below said first reference voltage.

10. The circuit according to claim 1, wherein said initialization unit starts to count and the integrated circuit stays in normal mode when said power voltage rises above second reference voltage.

11. The circuit according to claim 1, wherein said initialization unit counts a constant value to let said integrated circuit return to normal mode.

12. The circuit according to claim 11, wherein said constant value can be set flexibly as needed for supplying said integrated circuit enough time to return the normal mode.

* * * * *